United States Patent [19]
Nelson

[11] 3,929,434
[45] Dec. 30, 1975

[54] CORROSION REDUCTION OF TANKER VESSEL CARGO COMPARTMENTS

[75] Inventor: Earnest E. Nelson, Woodbury Heights, N.J.

[73] Assignee: Mobil Oil Corporation, New York, N.Y.

[22] Filed: Oct. 21, 1971

[21] Appl. No.: 191,274

[52] U.S. Cl. ............................................ 55/68; 55/73
[51] Int. Cl.² ............................................. B01D 53/14
[58] Field of Search ................... 55/68, 73; 220/88 B

[56] References Cited
UNITED STATES PATENTS

| | | | |
|---|---|---|---|
| 3,193,986 | 7/1965 | Forster | 55/68 |
| 3,285,711 | 11/1966 | Stanford | 220/88 B |
| 3,386,228 | 6/1968 | Hartmann | 55/68 |
| 3,502,428 | 3/1970 | Gelbein | 55/73 |

Primary Examiner—Charles N. Hart
Attorney, Agent, or Firm—Charles A. Huggett; Carl D. Farnsworth

[57] ABSTRACT

Reducing the corrosion of tanker vessels cargo tanks which are inerted with gaseous products of combustion is described as being improved when the inerting gases are freed of oxygen and particularly carbon dioxide to each less than 2%.

4 Claims, 1 Drawing Figure

U.S. Patent   Dec. 30, 1975   3,929,434
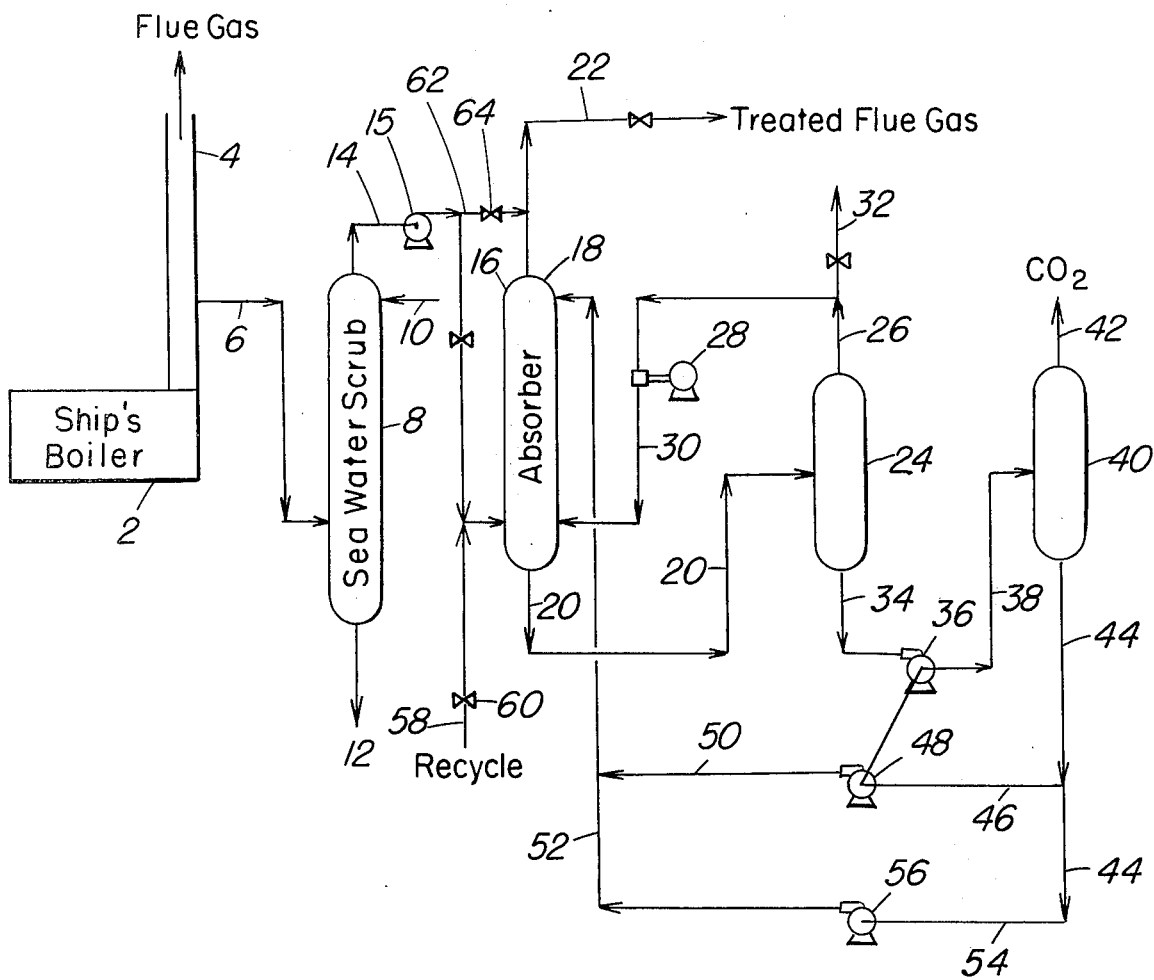

CORROSION REDUCTION OF TANKER VESSEL CARGO COMPARTMENTS

BACKGROUND OF THE INVENTION

A system for flue gas inerting of cargo tanks was first introduced by a U.S. Oil Company in 1925 but was later abandoned. In 1932 another U.S. company decided to use flue gas inerting as a safety measure in its sea-going tankers and developed a relatively simple system for this purpose. In 1962, a 42,000 tons dwt. tanker was fitted with an inert gas system. On this vessel certain tanks were isolated from the inert gas system to allow direct comparison to be made between inerted and non-inerted tanks. Since 1963 a large number of cargo vessels have been fitted with inerting systems. The original purpose of the low oxygen atmosphere furnished by the inerting system was to reduce the explosion hazard when carrying petroleum or other combustible cargos. It was also speculated that the corrosion rate of the steel tanks would be reduced by the low oxygen atmosphere.

SUMMARY OF THE INVENTION

The present invention is concerned with reducing corrosion of inerted ships cargo tanks. In a more particular aspect the present invention is concerned with inerting ships cargo tanks with gaseous material sufficiently low in oxygen and carbon dioxide to minimize explosion hazards and effect a further reduction in corrosion of the tanks.

BRIEF DESCRIPTION OF THE DRAWINGS

The FIGURE diagrammatically presents one arrangement of processing steps for removing carbon dioxide from ships flue gases used for inserting the tanks of cargo vessels.

DESCRIPTION OF SPECIFIC EMBODIMENTS

The operation of the inerting system of a tanker vessel may be better understood by reference to the following brief description. The vessel arrives at a loading terminal with all tanks inerted on the previous ballast passage. As ballast is discharged from a tank prior to loading, inerting gas is fed to the ballast tanks. When cargo is loaded into the vessel, the incoming liquid displace the inert gas from the cargo tanks through a vapor main connected to the atmosphere through a mast vent. During discharge of cargo, inerting gas is delivered under a slight pressure to the tanks. When the discharge of cargo has been completed, ballast is pumped into some of cargo tanks to put the vessel in a sea-worthy condition. The operation of the inert gas system at this time exactly corresponds with loading cargo as briefly described above.

The term "purging" is used to mean the process of passing inert gas through an empty tank. The provision of a separate purging pipe in each tank avoids the operational complications which may result from using the cargo suction piping to exhaust the gases. During purging the oxygen content of the emitted gases is measured and when the oxygen content is within 1% of that being supplied and less than 5% by volume, purging may stop. It is considered prudent after discharge of cargo, prior to tank washing and before and after ventilating a tank with fresh air.

The inerting of cargo tanks was originally intended to elimate explosion hazards and effect a significant reduction in corrosion of tanker metal particularly above the level of liquid or ullage space. In a corrosion study it was found however that some vessels encountered greater corrosion than others and this was attributed to the oxygen content of gases in contact with the metal.

In a study of vessels fitted with inerting gas systems, corrosion rates in the ullage space of about 0.005 inches per annum were encountered and compared with a non-inerted vessel having a corrosion rate of about 0.014 inches per annum. These corrosion rates refer to the loss of thickness in a structural member at a point about 3 inches below the deck. For example, a corrosion rate of 0.014 inch per annum would result in renewal of the corroded structure in the 9th year of service. Thus the savings in steel work renewals by effecting reductions in the rate of corrosion can be of substantial commercial benefit.

It has been found that in some inert gas systems as now operated that there was no reduction in corrosion but on the contrary corrosion was increased. This finding prompted a further study which terminated with the finding of this invention that carbon dioxide in the inerting gas was promoting corrosion. Thus the present invention is concerned with the renewal of carbon dioxide from inerting gas systems used on tanker vessels and the method for accomplishing that objective.

In accordance with this invention it is proposed to use flue gases from ships boilers to provide a low oxygen content inerting gaseous material which may be used for inerting ships cargo tanks and treating such inerting gases to remove carbon dioxide to a level which will significantly reduce corrosion of steel exposed thereto. Treatment of the flue gases may be effected after completing a water wash thereof to remove sulfur dioxide and prior to charge to the cargo tanks as herein briefly discussed or removal of the carbon dioxide from the inerting gas may be accomplished after completing the normal inerting procedures by causing the inerting gas to thereafter be passed or circulated from the tanks through a carbon dioxide removal procedure hereinafter discussed.

In order to avoid overly complicating the already complicated piping system of tanker vessels including that for inerting cargo tankage and to economize upon the treating facilities required, it is proposed in a specific embodiment to locate a relatively small carbon dioxide removal system in operating relationship with the existing inerting gas system of a tanker vessel so that once the inerting procedure has been completed and the tanker vessel has acquired essentially a steady state condition at least with respect to its cargo, then the inerting gas in the tankage will be caused to pass through the carbon dioxide treating system to remove carbon dioxide and other gasiform material and thus reduce the corrosion characteristics of the inerting flue gases. On the other hand, when the volume of required inerting gas is relatively low, it is contemplated passing the inerting flue gases after water washing directly to the carbon dioxide removal system before entering the inerting gas piping system of the vessel.

The removal of carbon dioxide from gaseous mixtures is known in the art. For example, in one method, pressure is relied upon to force dissolve carbon dioxide in a suitable solvent such as propylene carbonate. When the pressure is reduced, the carbon dioxide is released from the solvent to the atmosphere and the solvent is ready for reuse. In another process, steam is relied upon to release carbon dioxide from the solvent.

Other methods for recovering carbon dioxide from the flue gases include (a) treatment with aqueous monoethanol amine, (b) treatment with aqueous diethanolamine followed by caustic treatment, (c) treatment with hot potassium carbonate followed by aqueous monoethanolamine, (d) treatment with hot potassium carbonate followed by aqueous diethanolamine, (e) treatment with hot potassium carbonate followed by aqueous ammonia and caustic scrubbing, (f) water scrubbing followed by aqueous monoethanolamine and (g) treatment with aqueous ammonia followed by caustic scrubbing.

In the study leading to the concept of this invention the corrosion rates of steel were determined in sea water saturated with air, nitrogen, artificial flue gases and carbon dioxide as shown in Table 1. The results presented in the table, show that replacing air with flue gas results in an increase rather than a decrease in corrosion. The fact that carbon dioxide in the flue gas is corrosive is shown by the relatively high corrosion rate when carbon dioxide gas alone is used. The low rate with nitrogen shows how the removal of both oxygen and carbon dioxide greatly reduces corrosion. Similar results therefore would be obtained by removing carbon dioxide from the flue gases of the inerting gas system employed on ship tankers. The best atmosphere tested comprised nitrogen with about 0.5% oxygen and no carbon dioxide.

Table 1

Corrosion of Steel in Sea Water Saturated with Various Gases
Corrosion Rate, mpy

| Days Exposed | Nitrogen | Air | Artificial Flue Gas | Carbon Dioxide |
|---|---|---|---|---|
| 7 | 2.1 | 8.9 | 11.3 | 18.1 |
| 7 | 2.0 | 8.6 | 12.7 | 18.5 |
| 14 | 1.9 | 7.9 | 11.5 | 12.4 |
| 14 | 2.1 | 7.9 | 12.5 | 12.6 |
| 21 | 1.4 | 7.0 | 12.0 | 10.2 |
| 21 | 1.7 | 6.6 | 11.6 | 10.7 |
| 28 | 2.0 | 7.7 | 12.4 | 9.8 |
| 28 | 1.8 | 7.0 | 12.1 | 9.9 |
| 35 | 1.8 | 6.2 | 10.9 | 9.5 |
| 35 | 1.7 | 6.0 | 11.1 | 9.2 |
| Average | 1.8 | 7.4 | 11.8 | 12.1 |

Artificial flue gas consisted of the following percentage by volume:

| | |
|---|---|
| $N_2$ | 83% |
| $CO_2$ | 15% |
| $O_2$ | 2% |

One method for removing carbon dioxide from the boiler flue gases of a tanker vessel used for inerting the tanks may be as shown in the attached drawing. In the drawing, a ship's boiler 2 is shown in combination with a flue gas stack 4. Present-day combustion equipment operating at normal evaporation design rate are designed to provide ample boiler flue gas for inerting purposes having oxygen contents between 2 and 4% with a carbon dioxide level as high as 15%. Flue gases are withdrawn from stack 4 by conduit 6 for passage to a sea water scrubber 8. Sea water is introduced to scrubber 8 by conduit 10 and removed from the lower portion by conduit 12. The function of scrubber 8 is to clean and cool the flue gases and reduce the sulfur content thereof. By washing and scrubbing the flue gases with sea water, a major portion of the soot particles are removed and the gases are cooled to about 5°C. of the sea water temperature. Generally there is obtained about 90% removal of sulfur dioxide and the maximum possible reduction in solids burden not exceeding about 8 mg/m³. The sea water scrubbed flue gases pass by conduit 14 to compressor 15 and absorber 16 wherein the flue gases are treated under elevated pressure up to 800 or 1000 psig. to remove carbon dioxide with the higher pressures above 400 psig being favored. More usually pressure of about 800 psig has been found most satisfactory. In absorber 16 the carbon dioxide rich flue gases are contacted counter-currently with a suitable solvent introduced by conduit 18. The lean solvent is fed to the upper portion of the absorber at ambient or slightly sub-ambient temperature for passage downwardly through the column and counter-current to the rising flue gas. The solvent rich in $CO_2$ leaves the bottom of absorber column 16 by way of conduit 20. The treated flue gases, now comprising primarily nitrogen, not more than about 2% oxygen and less than b 2% carbon dioxide are removed from the scrubber by conduit 22 and enter the tanker inerting piping system known in the art. The carbon dioxide rich solvent also absorbs, water vapor, hydrogen sulfide, and mercaptans, if present, along with hydrocarbons in the gas stream. When the recycling system mentioned above is employed the amount of hydrocarbons encountered will vary depending upon the cycle encountered during inerting the vessel. The rich solvent solution recovered from the scrubber by conduit 20 is passed to an intermediate pressure flash tank 24 to release a major portion of the dissolved hydrocarbons and the resulting gas is removed by conduit 26, compressed by pump 28, and recycled by conduit 30 to the bottom of absorber 16. Excess hydrocarbons may be vented by 32. The solvent which is still at a relatively high pressure is next passed by conduit 34 through a power recovery turbine 36 and conduit 38 to a low pressure flash tank 40. In flash zone 40, the $CO_2$ is released from the depressured solvent and removed therefrom by conduit 42. In addition, water, hydrogen sulfide and mercaptans will be stripped during the depressuring by the relatively large volume of absorbed carbon dioxide. The solvent solution also cools during this depressuring-stripping step because of the heat release by $CO_2$ desorption and expansion. Cool lean solvent is thus recovered from the lower portion of zone 40 by conduit 44.

In the process flow arrangement of the figure, regeneration of the solvent as it is referred to is effected by low pressure or atmospheric pressure flashing in the low pressure flash drum 40 so that the lean solvent leaves this flash regeneration step in approximate equilibrium with carbon dioxide gas at about one atmospheric pressure. Since the lean solution returned to the absorber contains carbon dioxide equivalent to one atmosphere partial pressure, it obviously cannot reduce the carbon dioxide content of the treated gas below this level. At 800 psig, for example, this means a minimum carbon dioxide content in the treated gas of about 2% with the flow arrangement provided. If, on the other hand, a lower level of carbon dioxide is required, air or other inert gas may be used for stripping the solvent or vacuum flashing may be employed. In the arrangement shown a turbine is employed to recover energy from the solvent during pressure reduction when passed from the intermediate flash pressure zone to the atmospheric pressure zone. The power generated by this turbine is used to drive compressor 48 to which lean solvent is passed by conduit 44 and 46. Depending upon economics, turbines may be justified to recover energy during an initial pressure reduction or between these flash solutions, as above discussed. Additional energy recovery may be obtained by passing gases flashed from the solution at intermediate pressures through a gas expansion turbine. Provisions are made for passing lean solvent by conduit 44 and conduit 54 to a compressor 46 and thence by conduit 52 communicating with conduit 18 which conveys lean solvent to the upper portion of absorber 16. Suitable valves not shown are provided in the various processing streams to accomplish the process as above described.

The process arrangement above described is intended for the purification of gases containing carbon dioxide in relatively high concentrations at elevated pressures. Hydrogen sulfide and mercaptans in the gas do not interfere with the process and in fact removal of these materials with the carbon dioxide is realized. In the method of this invention, provision is made for recycling the inerting gas from any of the ships compartments so as to reduce the carbon dioxide level of the gas used therein provided the gas is of such a carbon dioxide concentration that the removal thereof is required to reduce it to an acceptable level less than 2%. Thus gas recycled from the cargo tank enters the carbon dioxide removal system by conduit 58 provided with valve 60. On the other hand, in the event that it is desirable to pass relatively large volumes of flue gas directly to the cargo tanks without effecting carbon dioxide removal then provision is made for by-passing absorber 16 by conduit 62 containing valve 64. Thus, by utilizing the carbon dioxide removal system only in conjunction with the recycling concept as herein identified, it becomes possible to minimize the requirements of this sytem and thus its economics so that such carbon dioxide removal becomes attractive and is particularly attractive for the large tanker vessels having a capacity of at least 100,000 dwt. tons.

In the processing arrangement above discussed, it is contemplated providing a treated flue gas, that is, a flue gas suitable for inerting the cargo tanks having an oxygen concentration less than 2%, a carbon dioxide concentration less than 2% and carbon monoxide in an amount less than 1% with the remaining gases primarily nitrogen. Inerting gases of the above defined composition are removed by conduit 22 for passage to the inerting piping system provided on the tanker vessel.

Having thus provided a general discussion of the method and concept of this invention and discussed specific examples in support thereof, it is to be understood that no undue restrictions are to be imposed by reasons thereof except as defined in the following claims.

I claim:

1. In a cargo vessel relying upon gaseous products of combustion to effect inerting of vessel compartments against explosion hazards, the improvement for reducing the corrosion of metal exposed to said inerting gas which comprises, reducing the carbon dioxide level of the inerting gas to less than 2 vol. percent.

2. The improvement of claim 1 wherein carbon dioxide is removed from the inerting gas before passage thereof to the vessel compartments.

3. The improvement of claim 1 wherein carbon dioxide is removed from the inerting gas after passage thereof to the vessel compartment by passing the inerting gas from the vessel compartment through a carbon dioxide removal step and returning carbon dioxide reduced inerting gas to the vessel compartment.

4. The improvement of claim 1 wherein carbon dioxide is removed by absorption in a liquid selective for that purpose under pressure.

* * * * *